(12) United States Patent
Hubby, Jr.

(10) Patent No.: US 7,019,810 B2
(45) Date of Patent: Mar. 28, 2006

(54) FIBER FACEPLATE SUSPENDED PARTICLE DISPLAY

(75) Inventor: Laurence M. Hubby, Jr., Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 368 days.

(21) Appl. No.: 09/838,235

(22) Filed: Apr. 20, 2001

(65) Prior Publication Data

US 2002/0154265 A1    Oct. 24, 2002

(51) Int. Cl.
*G02F 1/1333* (2006.01)

(52) U.S. Cl. .................... 349/159; 349/89; 349/91

(58) Field of Classification Search ............. 349/84, 349/89, 90, 91, 95, 159
See application file for complete search history.

(56) References Cited

U.S. PATENT DOCUMENTS

| | | | |
|---|---|---|---|
| 4,407,565 A | 10/1983 | Saxe | 350/374 |
| 5,148,297 A * | 9/1992 | Ishii et al. | 349/79 |
| 5,181,130 A * | 1/1993 | Hubby, Jr. | 349/63 |
| 5,329,386 A | 7/1994 | Birecki et al. | 359/42 |
| 5,442,467 A * | 8/1995 | Silverstein et al. | 349/159 |
| 5,463,491 A * | 10/1995 | Check, III | 359/296 |
| 5,463,492 A | 10/1995 | Check, III | 359/296 |
| 5,959,711 A * | 9/1999 | Silverstein et al. | 349/159 |
| 6,137,929 A | 10/2000 | Rosenberg et al. | 385/31 |
| 6,339,463 B1 * | 1/2002 | Silverstein et al. | 349/159 |

\* cited by examiner

*Primary Examiner*—Toan Ton
*Assistant Examiner*—George Y. Wang

(57) ABSTRACT

The present invention replaces liquid crystal light control elements in fiber-optic faceplate liquid crystal displays (LCD) with suspended particle devices (SPDs), and provides for passive light control without the need for either polarized light or special alignment layers. A fluid or film containing suspended particles may be asymmetric in shape so that their optical density depends strongly upon their orientation. The orientation of the particles within the fluid can be manipulated by an application of an electric field, so that the fluid or film may appear to be transparent to both polarizations of light when the electric field is applied, and opaque when the electric field is removed and the orientation of the particles is allowed to randomize naturally.

21 Claims, 1 Drawing Sheet

FIBER FACEPLATE SUSPENDED PARTICLE DISPLAY

TECHNICAL FIELD

The technical field relates generally to a visual image display, and, in particular, to a visual image display with a fiber-optic faceplate.

BACKGROUND

The object of fiber-optic faceplate displays is to provide a reflective, i.e., passively illuminated, display device that appears brightly illuminated even in difficult viewing conditions, and with a pleasingly diffuse "paper-like" appearance.

Fiber-optic faceplate displays are described, for example, in U.S. Pat. No. 5,181,130, issued to Hubby, entitled "Fiber Optic Faceplate Liquid Crystal Display," and U.S. Pat. No. 5,329,386, issued to Birecki and Hubby, entitled "Fiber-Optic Faceplate With Tilted Fibers."

U.S. Pat. No. 5,181,130, which is incorporated herein by reference, discloses a liquid crystal display (LCD) that includes a layer of liquid crystal material, a fiber-optic faceplate, and one or more polarizers. The fiber-optic faceplate serves to allow ambient light from a much wider range of incident angles to illuminate the LCD, and allows the viewer to position himself so as to avoid front surface glare and still see the display brightly illuminated, even in difficult lighting situations.

FIG. 1 shows the fiber-optic faceplate LCD disclosed in U.S. Pat. No. 5,181,130. An incident illumination from a single direction will be spread into a hollow cone by the action of individual fibers of a fiber faceplate 119. Upon passage through a liquid crystal cell, the illumination may encounter a mirror 107 that sends the illumination back through the cell without depolarization or attendant loss in intensity. A second passage through the fiber faceplate 119 may result in a second azimuthal diffusion and the same hollow conical far field pattern.

Since the diffusions take place entirely before and entirely after the double passage of the light through the LC cell and polarizers 105(a), 105(b), there is no loss in light due to depolarization. In addition, the volume representing the intensity of light scattered at a given angle is an article of revolution about the normal to the display surface, not about the direction of specular reflection.

Thus, U.S. Pat. No. 5,181,130 discloses an LCD structure including a fiber-optic faceplate that does not degrade the viewing angle, contrast, or other operating features of the liquid crystal element itself, provides a wider angle over which ambient light is received for the purposes of illumination, and provides that the viewer need not be close to a position that would cause specularly reflected ambient light to fall in the viewer's eyes.

The LCD structure taught in U.S. Pat. No. 5,181,130 and other patents, however, proved difficult to build and disappointing in performance because of the requirement for polarizers 105(a), 105(b) that must be placed internal to the liquid crystal cell and withstand its subsequent processing, especially the high temperature cure of the polyamide alignment layers. The polarizers 105(a), 105(b) that are marginally suitable typically have poor transmission and low dichromic ratio, resulting in a dim display with poor contrast, thus defeating most of the potential advantages of the fiber-optic faceplate display.

SUMMARY

A fiber faceplate replaces liquid crystal light control elements in fiber-optic faceplate LCDs with suspended particle devices (SPDs), which provide for passive light control without the need for either polarized light or special alignment layers. In this type of device, a fluid containing optically dense particles that are small enough to remain suspended may be placed either in a cell or within small bubbles in a layer of plastic film. The particles are asymmetric in shape in such a way that the apparent optical density of the particles depends strongly upon the particles' orientation. The orientation of the particles within the fluid can be manipulated by the application of an electric field, so that the fluid or film may appear to be transparent to both polarizations of light when the electric field is applied, and opaque when the electric field is removed and the orientation of the particles is allowed to randomize naturally.

DESCRIPTION OF THE DRAWINGS

The detailed description will refer to the following figures, in which like numerals refer to like elements, and wherein.

DETAILED DESCRIPTION

Figure 1:
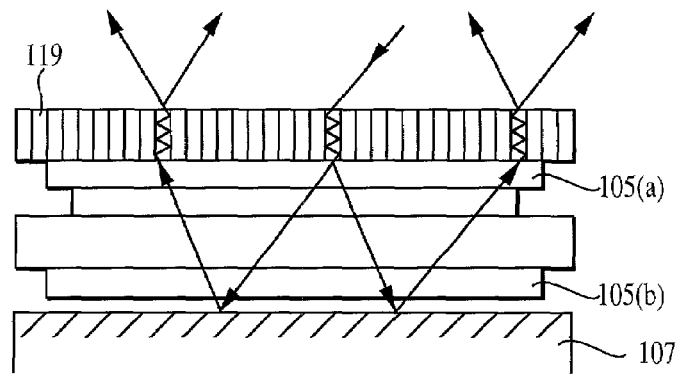
FIG. 1 shows a prior art fiber-optic faceplate LCD.

An improved fiber faceplate replaces the liquid crystal light control element, such as polarizers 105(a), 105(b), with SPDs, which provide for passive light control, similar in many ways to liquid crystals, but without the need for either polarized light or special alignment layers. In comparison to the LCDs, the SPDs have higher contrast and brightness, a wider angle of view, a lower estimated production costs, a less complex fabrication procedure, the ability to function over a wider temperature range, and a lower light loss. In this type of device, a fluid containing optically dense particles that are small enough to remain suspended may be placed either in a cell or within small bubbles in a layer of plastic film. The particles are asymmetric in shape in such a way that the particles' apparent optical density depends strongly upon their orientation. The orientation of the particles within the fluid can be manipulated by the application of an electric field, so that the fluid or film may become transparent to both polarizations of light when the electric field is applied, and opaque when the electric field is removed and the orientation of the particles is allowed to randomize naturally. These characteristics make SPDs a nearly ideal replacement for the liquid crystal light control element specified in the fiber-optic faceplate LCD patents, such as U.S. Pat. Nos. 5,181,130 and 5,329,386 mentioned above.

The optics of the fiber-optic faceplate SPDs provide additional benefits compared to the fiber-optic faceplate LCDs. For example, since both polarizations of incident light are used, the display is at least twice as bright, with all other things being equal, and no internal polarizers are required. Additionally, since no alignment structure is necessary on the fiber-optic faceplate, small amounts of relative motion between s front fiber-optic faceplate and rear substrates can be allowed by using a resilient, or even non-adherent, perimeter seal. This may accommodate a substantial difference in coefficient of thermal expansion between the rear substrate material and the fiber-optic faceplate, which may be necessary due to the limited range of material choices available for both substrates. If color filters are included to produce a color display, the color filters may be located on the rear substrate where the pixel locations are defined. In addition, film-type suspended particle media may be used by optically matching the medium to the front and rear substrates with adhesives and/or non-hardening fluid of the proper index of refraction to allow the two substrates to move slightly with respect to each other, thus accommodating the difference in thermal expansion.

SPDs in general are described in U.S. Pat. No. 4,407,565, issued to Saxe, entitled "Light Valve Suspension Containing Fluorocarbon Liquid," U.S. Pat. No. 5,463,491, issued to Check and Bayshore, entitled "Light Valve Employing A Film Comprising An Encapsulated Liquid Suspension, And Method Of Making Such Film," and U.S. Pat. No. 5,463,492, issued to Check and Bayshore, entitled "Light Modulating Film Of Improved Clarity For A Light Valve," which are incorporated herein by reference.

U.S. Pat. No. 4,407,565 discloses a SPD light valve including a cell containing a suspension of particles in a liquid suspending medium.

U.S. Pat. Nos. 5,463,491 and 5,463,492 disclose a SPD film suitable for use as the light modulating unit of a SPD light valve, including a cross-linked polymer matrix having droplets of a liquid light valve suspension distributed in the cross-linked polymer matrix, and a SPD light valve that includes such a film.

The SPD light valve may be described as a cell of fluid or a layer of film formed of two walls that are spaced apart by a small distance, with at least one wall being transparent. The walls may include electrodes in the form of transparent conductive coatings. The fluid or film may contain a liquid light valve suspension of small suspended particles. The liquid light valve suspension means a liquid suspending medium in which a plurality of small particles are dispersed. The liquid suspending medium may include one or more non-aqueous, electrically resistive liquids in which there is preferably dissolved at least one type of polymeric stabilizer that acts to reduce the tendency of the particles to agglomerate and to keep them dispersed.

In the absence of an applied electrical field, the particles in the liquid suspension may exhibit random Brownian movement, and hence a beam of light passing into the fluid or film may be reflected, transmitted or absorbed, depending upon the nature and concentration of the particles and the energy content of the light. On the other hand, when an electric field is applied through the liquid light valve suspension in the SPD light valve, the particles may become aligned and for many suspensions most of the light can pass through the fluid or film.

As is known, inorganic and organic particles may be used in a light valve suspension, such as mica, metals, graphite, metal halides, polyhalides (sometimes referred to as perhalides) of alkaloid acid salts and the like. The particles in the liquid suspension may be light-polarizing, such as halogen-containing light-polarizing materials, e.g., polyhalides of alkaloid acid salts. (The term "alkaloid" is used herein to mean an organic nitrogenous base, as defined in Hackh's Chemical Dictionary, Fourth Edition, McGraw-Hill Book Company, New York, 1969). If a polyhalide of an alkaloid acid salt is used, the alkaloid moiety may be a quinine alkaloid, as defined in Hackh's Chemical Dictionary, supra. U.S. Pat. Nos. 2,178,996 and 2,289,712 refer in detail to the use of polyhalides of quinine alkaloid acid salts. The particles may be light absorbing or light reflecting.

Also, the particles may be particles of a hydrogenated polyhalide of a quinine alkaloid acid salt, such as dihydrocinchonidine sulfate polyiodide, as described in U.S. Pat. No. 4,131,334, or a light-polarizing metal halide or polyhalide, such as cupric bromide or purpureocobaltchloride sulfate polyiodide, as described, for example, in U.S. Pat. No. 1,956,867. Preferably, the particles are light-polarizing polyhalide particles such as those described in U.S. Pat. Nos. 4,877,313 and 5,002,701, which are more environmentally stable than earlier prior art polyhalides.

In theory, any type of particle capable of reflecting, absorbing and/or transmitting desired wavelengths of visible light can be used in the liquid light valve suspension. Iodine is widely used for such particles.

The shape of the particles used in the light valve suspension should preferably be "anisometric," i.e., the shape or structure of the particle is such that in one orientation the particle intercepts more light than in another orientation. Particles that are needle-shaped, rod-shaped, lath-shaped, or in the form of thin flakes, are suitable. Light-polarizing crystals are especially useful because they produce a pleasing visual appearance, but any type of light-absorbing particle, preferably exhibiting very little light scatter, can be employed.

The particles are preferably of colloidal size, i.e., the particles will have a large dimension averaging about 1 micron or less. Preferably, most particles will have large dimensions less than one-half of the wavelength of blue light, i.e. 2000 Angstroms or less to keep light scatter extremely low.

The particles are also preferably light-absorbing, i.e., the particles absorb a significant part, preferably most, of the light impinging on them and scatter relatively little of the light that impinges on them. Light-absorbing particles may include many types of material including colored orientable pigments and dyes, e.g., garnet red, conductive black or grey material such as graphite or carbon black, dichromic dyes such as are widely used in guest-host liquid crystal devices, light-polarizing materials, e.g., cupric bromide, and polyhalides.

Figure 2A:
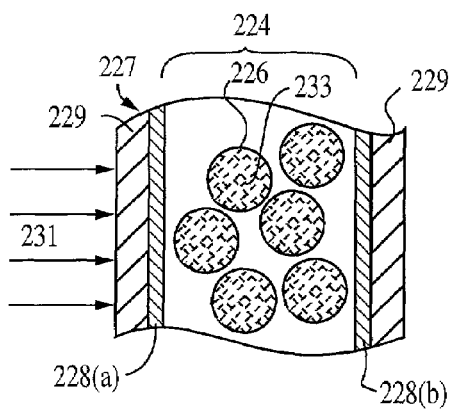
FIGS. 2(a) and 2(b) illustrate the transparent and opaque states of one type of a SPD film.

Referring to FIG. 2(a), in a side sectional view of a SPD light valve 227, a beam of light 231 impinges on the SPD light valve 227. The SPD light valve 227 may include a layer of SPD fluid or film 224 containing light valve suspension droplets 226, and a pair of electrodes 228(a), 228(b) in contact with the opposite surfaces of the layer of SPD fluid or film 224. Protective layers 229 may be positioned in contact with each electrode 228(a), 228(b). If no potential difference, i.e., electric field, exists between the electrodes 228(a), 228(b), suspended particles 233 dispersed within the light valve suspension droplets 226 may be in random positions due to Brownian movement. Because the particles 233 absorb light, the beam of light 231 impinging on the SPD light valve 227 may be absorbed by the particles 233 within the light valve suspension droplets 226.

Figure 2B:
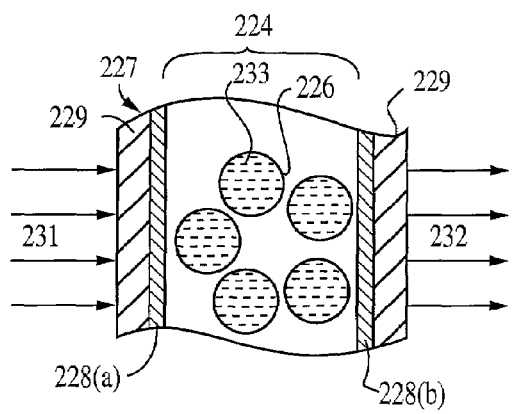

Referring to FIG. 2(b), if an electric field (not shown) is applied between the electrodes 228(a), 228(b), the particles 233 may align within the light valve suspension droplets 226, and a considerable portion of the beam of light 231 may pass through the SPD light valve 227 as indicated by the arrows 232.

Electrodes 228(a), 228(b) for use in the SPD light valves 227 and methods of depositing electrodes 228(a), 228(b) on glass and plastic substrates 107 are well known in the art. For example, U.S. Pat. Nos. 3,512,876 and 3,708,219 disclose use of electrodes in SPD light valves, and U.S. Pat. Nos. 2,628,927, 2,740,732, 3,001,901 and 3,020,376 disclose articles having conductive and especially conductive transparent coatings on glass and plastic substrates and methods of forming or depositing such coatings. Indium tin oxide ("ITO") or other conductive metal can be used.

The term "electrode" shall be understood to mean not only electrically conductive metal oxide and other coatings used in the art for such purpose but also such coatings that have dielectric overcoatings on them of materials such as silicon monoxide or dioxide, titanium dioxide, aluminum oxide, tantalum pentoxide, magnesium fluoride, or other materials. The electrodes $228(a)$, $228(b)$ may cover all or part of the substrate 107 on which they are located and may also be applied in patterns. For example, in a SPD light valve 227 functioning as a variable light transmission window or filter, one would usually wish to vary the amount of light passing through the entire active area of the device. On the other hand, if the SPD light valve 227 were intended to be used as a display device, the electrodes $228(a)$, $228(b)$ would normally be deposited in patterns in discrete areas of the substrate 107. The term "electrode" also includes use of semiconductor films and plural film layers, both transparent and colored, such as are used in active matrix addressed display devices. In all cases where the SPD fluid or film 224 is used in a device, the device includes appropriate electrical connections leading to a power supply suitable to operate the device.

By replacing the LCDs with the SPDs, the optics of the fiber-optic faceplate may produce the same benefits as explained in U.S. Pat. No. 5,181,130 without the need for either polarized light or special alignment layers. These benefits may include bright display appearance over a substantial viewing angle range relatively independent of the number and location of illumination sources, a diffuse, paper-like appearance in the light areas of the display, and an image that appears to be on the front surface of the display with which can be interacted by the user with little or no problems due to parallax, i.e., in the case of a touch screen. In addition to these common benefits, the optics of the fiber-optic faceplate with SPDs may be more practical than the LCDs taught in U.S. Pat. No. 5,181,130.

Figure 3:
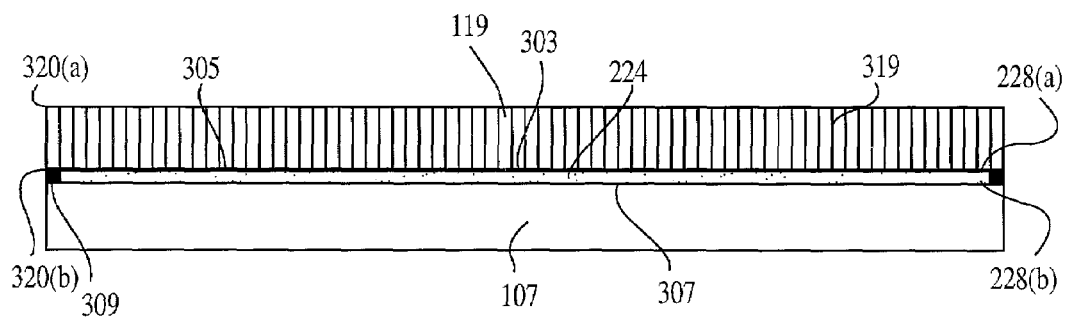
FIG. 3 illustrates one embodiment of a fiber-optic faceplate SPD of the present invention.

FIG. 3 illustrates one embodiment of a fiber-optic faceplate with a SPD. The front layer (top layer in the drawing) with vertical lines may be a fiber-optic faceplate 119 with a front face (upper face in the drawing) $320(a)$ and a rear face (lower face in the drawing) $320(b)$. The fiber-optic faceplate 119 maybe made of millions of straight optical fibers 319 that are fused together and whose longitudinal axes are parallel to each other and perpendicular to the upper face $320(a)$ and the lower face $320(b)$ of the faceplate 119. Each of the fibers 319 may collect and project through the faceplate 119 light rays impinging from the upper face of the faceplate 119.

The fiber-optic faceplate 119 may be fabricated to a thickness in the range of approximately 0.25 to 5.0 millimeters, preferably about 1.0 millimeters, having individual fibers in the range of, for example, 6 to 50 microns.

The rear layer (bottom layer in the drawing) may be a rear substrate 107, such as glass, mirror, or plastic. A thin layer of SPD fluid or film 224 captured in the SPD light valve (cell) 227 may lie between the fiber-optic faceplate 224 and the substrate 107.

A pair of conductive electrodes $228(a)$, $228(b)$ may be positioned on the inner surface (bottom surface in the drawing) of the faceplate 119 and on the outer surface (top surface in the drawing) of the rear substrate 107. Both the top electrode $228(a)$ and the bottom electrode $228(b)$ may be transparent to light and in contact with opposite surfaces of the layer of SPD fluid or film 224, i.e., the layer of SPD fluid or film 224 is positioned between the two electrodes $228(a)$, $228(b)$. The bottom electrode $228(b)$ may be made of metals that are good electrical conductors and reflect light well, such as aluminum.

If a voltage is applied between these two electrodes $228(a)$,$228(b)$, a electric field (not shown) may be established perpendicular to the two electrodes $228(a)$, $228(b)$. The electric field may cause a polarization in the suspended particles 233 within the light valve suspension droplets 226, which may develop a dipole moment that opposes the electric field caused by the electrodes $228(a)$, $228(b)$. The net effect is that these suspended particles 233 may become aligned, and most of the light coming from the front surface (top surface in the drawing) can pass through the SPD fluid or film 224. Consequently, the SPD fluid or film 224 may appear to be transparent to light. To prevent the particles 233 from moving inside the SPD fluid or film 224, an alternating electric field may be generated. The thus-generated alternating electric field eliminates the electrophoresis effect, which causes the dipoles 226 in the electric field not only to align but also to move with the electric field.

In the absence of an electrical field, the particles 233 in the liquid light valve suspension droplets 226 may exhibit random Brownian movement, and hence a beam of light passing into the SPD fluid or film 224 may be reflected, transmitted or absorbed, depending upon the nature and concentration of the particles and the energy content of the light. Consequently, the SPD fluid or film 224 may appear to be opaque.

Accordingly, by using electricity, the transmission of light can be controlled efficiently without the need to polarize the light. Since both polarizations of incident light may be used, the display may be at least twice as bright in comparison with the fiber-optic faceplate LCDs, with all other things being equal. Furthermore, internal polarizers $105(a)$, $105(b)$ are not required.

A transparent conductive layer 305 for pixel drive may be coated underneath the fiber-optic faceplate 119, and on top of the layer of SPD fluid or film 224. If the SPD film 224 is used, a thin layer of index matching fluid 303 may be coated on top of the SPD film 224.

Since no alignment structure is necessary on the fiber-optic faceplate 119, small amounts of relative motion between the front fiber-optic faceplate 119 and the rear substrate 107 can be allowed by using a resilient, or even non-adherent, perimeter seal 309, positioned at the outer edges of the layer of SPD fluid or film 224. The use of the perimeter seal 309 may accommodate a substantial difference in coefficient of thermal expansion between the rear substrate material 107 and the fiber-optic faceplate 119, which may be necessary due to the limited range of material choices available for both substrates. If color filters 307 are included to produce a color display, the color filters 307 may be located on the rear substrate 107 where the pixel locations are defined. Film-type suspended particle media may also be used by optically matching it to the faceplate 119 and rear substrate 107 with adhesives and/or non-hardening fluid of the proper index of refraction, allowing the two substrates to move slightly with respect to each other to accommodate the difference in thermal expansion discussed above.

While the SPD fiber faceplate has been described in connection with an exemplary embodiment, it will be understood that many modifications in light of these teachings will be readily apparent to those skilled in the art, and this application is intended to cover any variations thereof.

What is claimed is:

1. A visual image display comprising:
   a fiber-optic faceplate; and
   a suspended particle device light valve in optical communication with the fiber optic faceplate, the light valve including a plurality of particles in a suspension medium.

2. The display of claim 1, wherein:
   the fiber-optic faceplate includes:
      an upper face;
      a lower face; and
      a multiplicity of straight optical fibers positioned between the upper face and the lower face of the faceplate;
      wherein longitudinal axes of the optical fibers are parallel to each other and substantially perpendicular to the upper face and the lower face of the faceplate; and
      wherein each of the fibers collects and projects through the faceplate a plurality of light rays emitted by an ambient light source; and
   the suspended particle device (SPD) further includes:
      a pair of electrodes on opposite surfaces of a layer of the SPD, wherein orientations of the particles depend on an application of an electric field to the electrodes.

3. The visual image display of claim 2, further comprising a transparent conductive layer coated underneath the lower face of the faceplate and on top of the layer of SPD.

4. The visual image display of claim 2, further comprising resilient perimeter seals at both ends of the layer of SPD.

5. The visual image display of claim 2, wherein the particles align in the direction of the electric field when the electric field is applied, whereby the layer of the SPD becomes substantially transparent to the plurality of light rays.

6. The visual image display of claim 2, wherein particles randomize when the electric field is removed, whereby the layer of the SPD becomes substantially opaque.

7. The visual image display of claim 2, further comprising color filters positioned on a rear substrate to produce a color display, wherein the rear substrate is positioned underneath the layer of the SPD.

8. The visual image display of claim 2, wherein the fiber-optic faceplate is formed to a thickness within the range of approximately 0.25 to 5.0 millimeters.

9. The visual image display of claim 2, wherein the layer of SPD comprises a layer of SPD fluid.

10. The visual image display of claim 2, wherein the layer of SPD comprises a layer of SPD film.

11. The display of claim 1, wherein the light valve further includes first and second electrodes, the suspension medium between the first and second electrodes.

12. The display of claim 1, further comprising a substrate, the light valve sandwiched between the faceplate and the substrate; wherein no polarizer is between the light valve and the faceplate.

13. The display of claim 1, further comprising a color filter positioned adjacent the suspended particle device.

14. The visual image display of claim 10, further comprising a thin layer of index matching fluid positioned on top of the layer of SPD film.

15. A visual image display, comprising:
   a fiber-optical faceplate;
   a layer underneath the faceplate, wherein the layer includes a liquid light valve suspension and particles suspended in droplets of the liquid light valve suspension, wherein the particles are capable of absorbing or reflecting light; and
   a pair of electrodes positioned in contact with opposite surfaces of the layer;
   wherein orientations of the particles depend on an application of an electric field to the electrodes; and
   wherein the display contains no polarizers.

16. The visual image display of claim 15, further comprising resilient perimeter seals at both ends of the layer.

17. The visual image display of claim 15, wherein the particles align in the direction of the electric field when the electric field is applied, whereby the layer becomes substantially transparent to the light.

18. The visual image display of claim 15, wherein particles randomize when the electric field is removed, whereby the layer becomes substantially opaque.

19. The visual image display of claim 15, further comprising a substrate and color filters positioned on the substrate to produce a color display, wherein the substrate is underneath the layer.

20. Apparatus comprising:
   a substrate;
   a color filter on the substrate;
   a suspended particle device on the color filter; and
   a fiber-optic faceplate on the suspended particle device.

21. The apparatus of claim 20, further comprising means for sealing the suspended particle device to the faceplate, the means allowing motion of the faceplate relative to the suspended particle device.

* * * * *